US007318097B2

(12) United States Patent
Bernoth (10) Patent No.: US 7,318,097 B2
(45) Date of Patent: Jan. 8, 2008

(54) SECURITY CHECKING PROGRAM FOR COMMUNICATION BETWEEN NETWORKS

(75) Inventor: Andrew John Bernoth, Frederick, CO (US)

(73) Assignee: International Business Machines Corporation, Armonk, NY (US)

( * ) Notice: Subject to any disclaimer, the term of this patent is extended or adjusted under 35 U.S.C. 154(b) by 946 days.

(21) Appl. No.: 10/464,006

(22) Filed: Jun. 17, 2003

(65) Prior Publication Data

US 2004/0260810 A1   Dec. 23, 2004

(51) Int. Cl.
*G06F 15/173* (2006.01)
(52) U.S. Cl. ............... 709/225; 709/223; 709/226; 726/11
(58) Field of Classification Search ............ 709/249, 709/223–226; 726/1, 2, 11–13
See application file for complete search history.

(56) References Cited

U.S. PATENT DOCUMENTS

| | | | | |
|---|---|---|---|---|
| 5,142,622 A * | 8/1992 | Owens | ............... | 709/227 |
| 5,280,477 A | 1/1994 | Trapp | ............... | 370/85.1 |
| 5,535,373 A | 7/1996 | Olnowich | ............... | 395/500 |
| 5,581,558 A | 12/1996 | Horney et al. | ............... | 370/401 |
| 5,764,887 A | 6/1998 | Kells et al. | ............... | 395/186 |
| 5,953,340 A | 9/1999 | Scott | ............... | 370/401 |
| 6,009,247 A | 12/1999 | Canora et al. | ............... | 395/309 |
| 6,038,608 A * | 3/2000 | Katsumata | ............... | 709/238 |
| 6,058,434 A | 5/2000 | Wilt et al. | ............... | 709/300 |
| 6,098,138 A | 8/2000 | Martinelli et al. | ............... | 710/129 |
| 6,104,716 A | 8/2000 | Crichton et al. | ............... | 370/401 |
| 6,205,216 B1 | 3/2001 | Slater et al. | ............... | 379/229 |
| 6,212,558 B1 | 4/2001 | Antur et al. | ............... | 709/221 |
| 6,212,636 B1 * | 4/2001 | Boyle et al. | ............... | 713/168 |
| 6,243,581 B1 | 6/2001 | Jawanda | ............... | 455/432 |
| 6,272,551 B1 | 8/2001 | Martin et al. | ............... | 709/250 |
| 6,292,900 B1 * | 9/2001 | Ngo et al. | ............... | 726/6 |
| 6,389,029 B1 | 5/2002 | McAlear | ............... | 370/402 |
| 6,453,360 B1 | 9/2002 | Muller et al. | ............... | 709/250 |
| 7,225,255 B2 * | 5/2007 | Favier et al. | ............... | 709/225 |
| 2002/0133534 A1 * | 9/2002 | Forslow | ............... | 709/200 |

FOREIGN PATENT DOCUMENTS

| | | |
|---|---|---|
| GB | 2268668 A | 1/1994 |
| JP | 5235945 A | 9/1993 |
| WO | WO 02/073921 | 7/1993 |

* cited by examiner

*Primary Examiner*—Glenton B. Burgess
*Assistant Examiner*—Brendan Y Higa
(74) *Attorney, Agent, or Firm*—Arthur J. Samodovitz (57) ABSTRACT

A method for determining if a multiplicity of networks are authorized to communicate with each other and what IP protocol can be used for communication between each combination of two of the networks. For each network, a computer readable data base stores a record of (a) IP protocol(s) permitted to be used with said each network and (b) types of other networks permitted to communicate to said each network. For said each network, a computer readable data base stores a record of IP protocols and destination and source networks permitted by a respective firewall or router for said each network. For said each network, a computer readable data base stores a record of a type of said each network. Multiple combinations of the networks are automatically identified. Each of the combinations comprises a source network and a destination network. For each of the combinations, based on the records, it is automatically determined if each of the networks in the combination is permitted to communicate with the other network in the combination and what IP protocol(s) are common to both of the networks in the combination.

5 Claims, 5 Drawing Sheets

SECURITY CHECKING PROGRAM FOR COMMUNICATION BETWEEN NETWORKS

FIELD OF THE INVENTION

The invention relates generally to communication between computer networks, and deals more particularly with a system and method for determining which networks are authorized to communicate with each other and which IP protocols should be used for the communications based on configurations of the networks.

BACKGROUND OF THE INVENTION

Communications flow from one network to another, and the communication gateway for each network is usually a firewall or router. A firewall comprises a router and a filter to screen out unwanted messages. There are different types of networks. For example, there may be an intranet for local communications within an enterprise. It is presumed that all users of the intranet are trustworthy because they all work for the same enterprise. Therefore, usually there is relatively little security concern within the intranet. However, oftentimes users of the intranet want to communicate with another entity located on another network outside of the intranet. Because this other entity may not work for the enterprise, and this other network is not under control of the enterprise, this other entity and network cannot be thoroughly trusted. Therefore, a firewall may be installed at the gateway to the intranet. The firewall is responsible for enforcing a security policy for incoming communications. This security policy may define which types of networks that the intranet is permitted to communicate and what protocols are permitted for the communications.

For example, the firewall may only permit communications with the enterprise's "Demilitarized Zone" or "DMZ", if any. The enterprise DMZ comprises servers and other related devices that are supplied and managed by the enterprise, but do not contain sensitive data, or the only copy of sensitive data. Therefore, if the servers in the enterprise DMZ are corrupted by a communication from another network, the damage is repairable. Also, the management of the servers and related devices in the enterprise DMZ allows the enterprise a measure of security in the enterprise DMZ. The enterprise DMZ may be authorized to communicate with the untrusted network directly or through another DMZ of another enterprise. It is also possible to connect the intranet with its firewall directly to one or more untrusted networks, and rely on the intranet's firewall to provide security. Other types of networks which are less secure do not have a firewall. Instead, they connect directly to other networks through a router.

The most common protocols are TCP, UDP and ICMP. Each of these protocols includes additional criteria such as the range of ports used by TCP and UDP for certain types of requests, and the types and codes of ICMP. The TCP and UDP ports indicate which application in the recipient device should provide the requested services. It is also desirable in some cases to limit the range of ports for certain types of communications. The limitation on the range of ports facilitates the handling of the requested service. For example, many programs are written to open any available TCP or UDP port. This makes the identification of the application using such a port difficult. In some such cases it is possible to restrict the range of ports available to these applications to assist in identifying which application is using the port. It may be preferable for some networks to not communicate with another network which uses a different range of TCP or UDP ports. Also, some networks may not wish to accept certain types of ICMP messages. For example, some destination networks may not wish to process "route redirect" messages as the device sending the "route redirect" may not be trusted. Furthermore, some protocols are more controllable than others. For example, TCP provides "handshaking" for every communication whereas UDP does not. So, TCP is more controllable than UDP and therefore it may be preferable for some networks to not accept UDP communications.

Different techniques have been used to determine if two networks, connected through firewalls or routers are authorized to communicate with each other, and which protocols including additional criteria are authorized for the communication. For example, if a systems administrator of an external network wants to communicate through its firewall or router to an enterprise with the enterprise's firewall, the systems administrator of the external network can simply send its configuration information to a systems administrator for the enterprise. The configuration information may include the type of external network and the protocols it supports including the additional criteria for each protocol. Then, the systems administrator of the enterprise manually reviews the configuration information and determines if this external network should be permitted to communicate with the enterprise through the enterprise's firewall and if so, what IP protocol to use. If the system administrator believes the requested flow is acceptable according to the company policy, the systems administrator updates a file in the firewall of the enterprise to permit it to communicate with the external network with a specified IP protocol including additional criteria. Likewise, the systems administrator of the external network will update a file in its firewall or router to permit it to receive communications from the enterprise network with a specified IP protocol including additional criteria.

Usually once a year, sometimes more often depending on the company policy, all the filter rules must be verified to ensure they still conform to the company policy. Traditionally this is completed manually by the systems administrator, or a person outside of the day-to-day operations of the firewall such as a security administrator. The systems administrator or security administrator reviews each firewall rule to confirm the network type of each IP address and ensures that the flows configured in the firewall are acceptable according to the company policy. While this technique is effective, it requires tedious, human review of the configuration information from each network with which communication is desired, and there can be many such networks. Also, it focusses on checking permissibility of specified communications, rather than determining all potential permitted communications. Also, routers and firewalls of networks are often changed, and this may require the foregoing interaction between the systems administrator or security administrator to be repeated.

There is another technique to determine if two networks, connected through firewalls or routers are authorized to communicate with each other, and which protocols (including additional criteria) are authorized for the communication. According to this technique, a packet generator is located inside the firewall or router of an originating network being checked for compatibility with other networks. The packet generator sends a set of communication packets onto the network, but preferably to an unoccupied IP address. The communication packets of each set have different IP protocols with different additional criteria, but ones that the originating network supports. A "sniffer" is located just outside the firewall or router of the originating network and logs the generated packets that are allowed to pass through the firewall or router of the originating network. Based on the presence or absence of the original packet being logged by the "sniffer" a report can be generated as to what traffic the firewall or router allows through. This report can then be compared with the corporate security standards. While this technique is partially automated, it burdens the networks with many communication packets to handle. Also, it does not consider the type of destination network as a criteria in determining whether the originating network should permit communication; this is still left as a manual task once the report has been manually generated. The other concern is that the corporate security standards often change.

Accordingly, a general object of the present invention is to provide a technique to determine which types of networks can communicate with each other and which IP protocols can be used for such communication.

A more specific object of the present invention is to provide a technique of the foregoing type which is at least partially automated.

SUMMARY OF THE INVENTION

The invention resides in a technique for determining if a multiplicity of networks are authorized to communicate with each other and what IP protocol can be used for communication between each combination of two of the networks. For each network, a computer readable data base stores a record of (a) IP protocol(s) permitted to be used with said each network and (b) types of other networks permitted to communicate to said each network. For said each network, a computer readable data base stores a record of IP protocols and destination and source networks permitted by a respective firewall or router for said each network. For said each network, a computer readable data base stores a record of a type of said each network. Multiple combinations of the networks are automatically identified. Each of the combinations comprises a source network and a destination network. For each of the combinations, based on the records, it is automatically determined if each of the networks in the combination is permitted to communicate with the other network in the combination and what IP protocol(s) are common to both of the networks in the combination.

According to one feature of the present invention, the record of IP protocols and destination and source networks comprises a record of IP protocols and destination addresses and source addresses. The record of a type of each network comprises a table correlating the destination addresses to respective network types and correlating source addresses to respective network types.

DETAILED DESCRIPTION OF THE PREFERRED EMBODIMENTS

Figure 1:
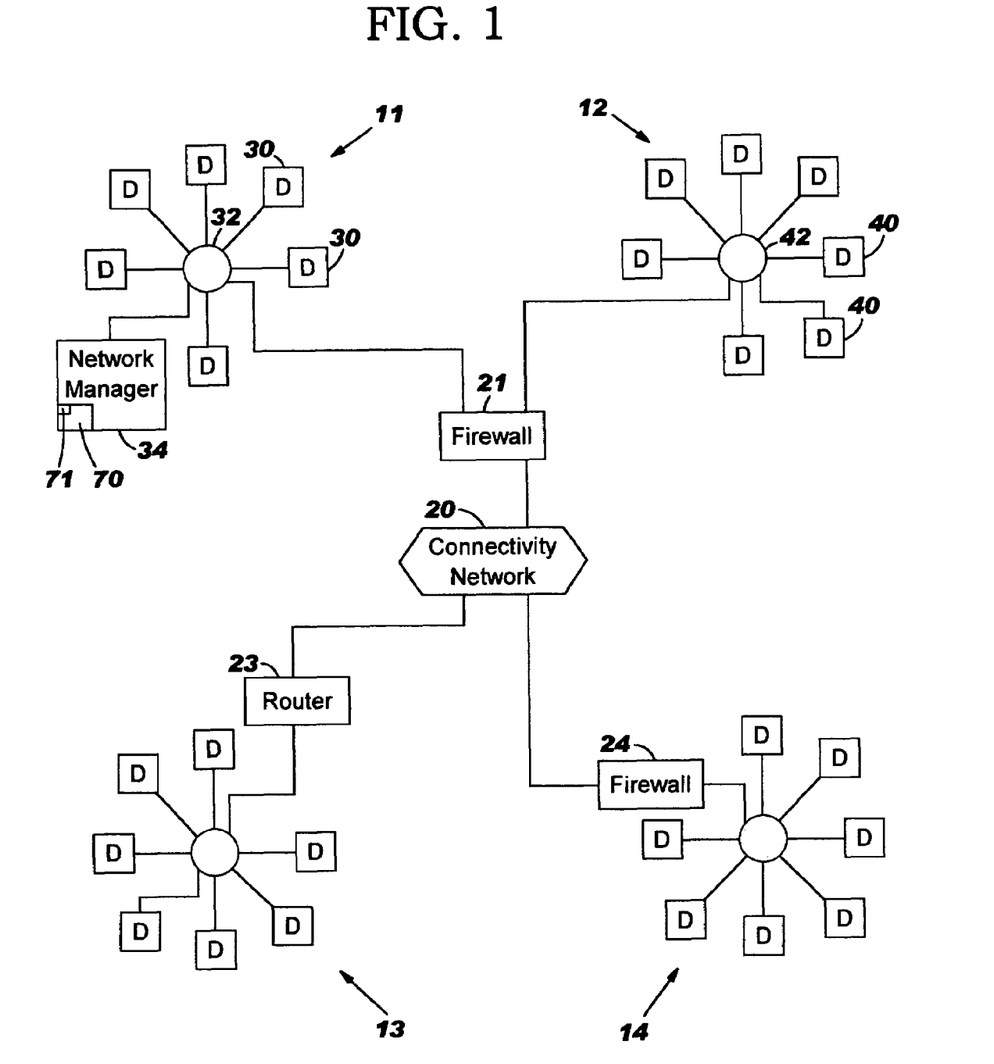
FIG. 1 is a block diagram of multiple, interconnected networks in which the present invention can be used, and includes a network manager to execute a security checking program according to the present invention.

Referring now to the drawings in detail wherein like reference numbers indicate like elements, FIG. 1 illustrates four networks 11-14 interconnected by a connectivity network 20. All of FIG. 1 is prior art except for a security checking program 70 and associated table 71 described below. Networks 11 and 12 share a firewall 21 located between networks 11 and 12 and the connectivity network 20. Network 13 has a router 23 located between the network 13 and the connectivity network 20. Network 14 has a firewall 24 located between the network 14 and the connectivity network 20. The firewall 21, firewall 24 and router 23 are also known in the prior art. By way of example, network 11 is an enterprise intranet, network 12 is a DMZ for network 11, network 13 is an untrusted network from the point of view of network 11 and network 14 is an untrusted network from the point of view of the network 11. By way of example, network 14 is the World Wide Web and network 13 is a third party customer network. However, the present invention can be used with a wide variety of networks. Also by way of example, the connectivity network comprises LAN, WAN or VPN. However, the nature of the connectivity network 20 is not pertinent to the present invention. Network 11 comprises a server 32 and user work stations 30,31 and a network manager work station 34 to execute the security checking program 70. Network 12 comprises a server 42 and user work stations 40,41 for "help desks". Network 13 comprises user work stations 50,51 and a server 52. Network 14 comprises user work stations 60,61 and a server 62. However, the arrangement of work stations within each network is not pertinent to the present invention except to provide a network management station within network 11 to execute the security checking program and insofar as the IP protocols that the networks support.

The security checking program 70 is executed at the network manager workstation 34 within the intranet 11 behind the firewall 21. Network manager 34 communicates with DMZ network 12 via firewall 21, and communicates with networks 13 and 14 via DMZ network 12 and connectivity network 20. DMZ network 12 communicates with network 13 via firewall 21, connectivity network 20 and router 23. DMZ network 12 communicates with network 14 via firewall 21, connectivity network 20 and firewall 24.

Figure 2:
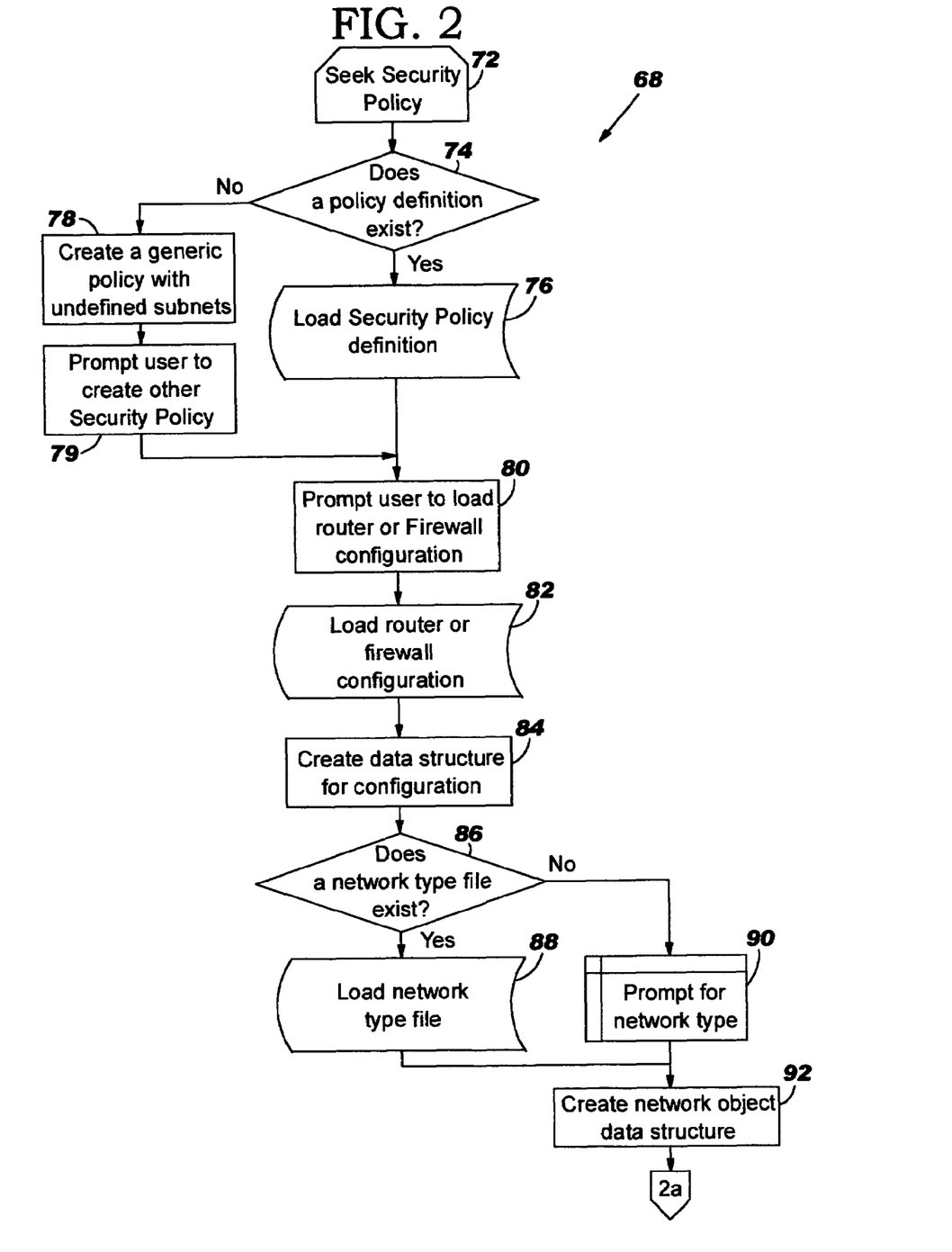
FIG. 2 is a flow chart illustrating operation of an initialization part of the security checking program of FIG. 1.

FIG. 2 is a flow chart illustrating an initialization function 68 within security checking program 70. The purpose of the initialization function is to build a data structure which represents a security policy for each network 11-14, a type of each network 11-14 and IP protocols permitted through a firewall or router for each network. The "security policy" of each network is a definition of what types of other networks this network can communicate and what IP protocols can be used. The remaining part 100 of the security program 70 described below, with reference to FIGS. 3(a) and 3(b), then uses the data structure to determine which networks are authorized to communicate with each other and which IP protocols (including additional criteria) should be used for the communications. The following detailed description of security checking program 70 applies equally to all "network objects", i.e. networks, sub-network or a host type of each network, even though in the illustrated flow chart and detailed description thereof only "networks" may be described.

Initialization function 68 operates as follows. First, the function 68 seeks a security policy (step 72). This policy could have been stored in a file generated by the systems administrator or can be manually entered by the systems administrator prior to execution of the initialization function. Generally, the systems administrator has responsibility for communications between all the networks that are being reviewed by the initialization function (such as networks 11-14) and some knowledge of the IP configurations of these networks. The security policy file for each network defines the types of other networks permitted to communicate with said each network according to the documented corporate security policy of said each network, such as "intranet", "DMZ", "Customer" and "Internet", as well as types of traffic/protocols permitted between each network type. The systems administrator also needs text configuration information for the routers or firewalls of networks 11-14. The text configuration information for each router or firewall includes source IP address(es), destination IP address(es), IP protocols, and ports and types that are permitted by the router or firewall. The "source IP addresses" are the IP addresses of those networks which can send packets through the router or firewall, and the "destination IP addresses" are the IP addresses of those networks which can receive the packet sent through the router or firewall. The "IP protocols" stored in the text configuration file for each router or firewall are the IP protocols supported for each communication between source IP address and destination IP address. The systems administrator uses the default communication method (and optionally, protocol) of the router or firewall for obtaining the text configuration files for the router or firewall, prior to running the initialization function.

If a security policy is known (decision 74), it is loaded into the function 68 (step 76). If not, function 68 creates a default security policy which does not permit communication with any other network (step 78). The systems administrator would then have the option of loading a security policy file for the network under investigation or creating one for use (step 79). Next, function 68 prompts the systems administrator to enter or load the firewall or router configuration information described above for a router or firewall (step 80). (Steps 80-250 are repeated for each firewall or router.) The firewall or router configurations are then loaded into the function 68 (step 82). Next, function 68 creates a data structure representing the foregoing security policies and IP configurations (step 84). Next, function 68 determines if there is a file identifying the type of network for known network objects (decision 86). Such a file maps the IP addresses of networks 11-14 to the network types defined in the security policy file. In the illustrated example, the possible types are source and/or destination "intranet", source and/or destination "DMZ" and source and/or destination "untrusted". If the network types were previously stored, function 68 loads the definition (step 88). If not, the systems administrator will need to enter the information in real time (step 90). Next, the foregoing information (i.e. IP address of each network object where "network object" is either a network, sub-network or a host type of each network as it maps to the security policy) collected in the steps of FIG. 2 is stored in a network object data structure (step 92)

Figure 3A:
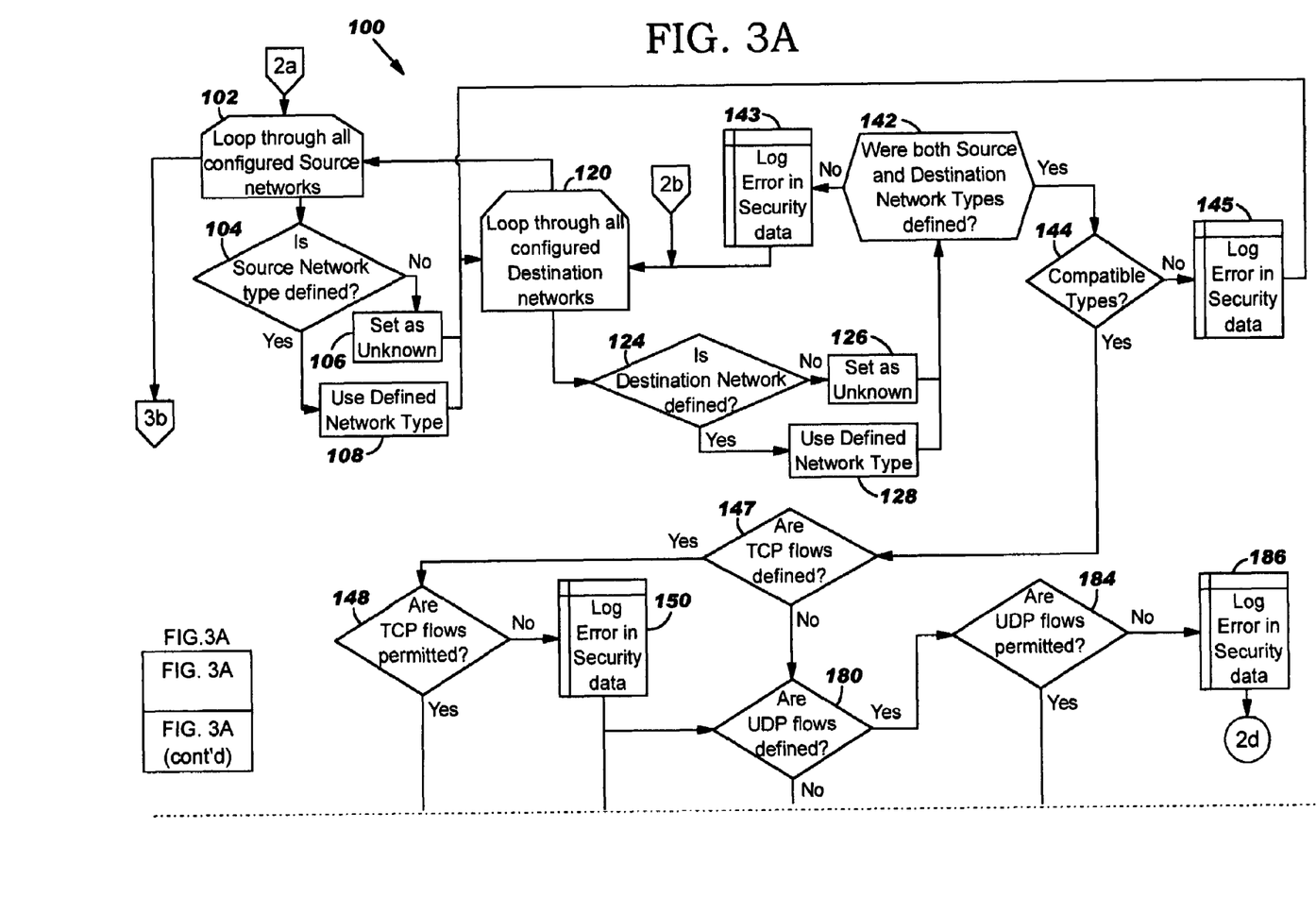
FIGS. 3(a) and (b) form a flow chart illustrating operation of another, security checking part of the security checking program of FIG. 1.
Figure 3B:
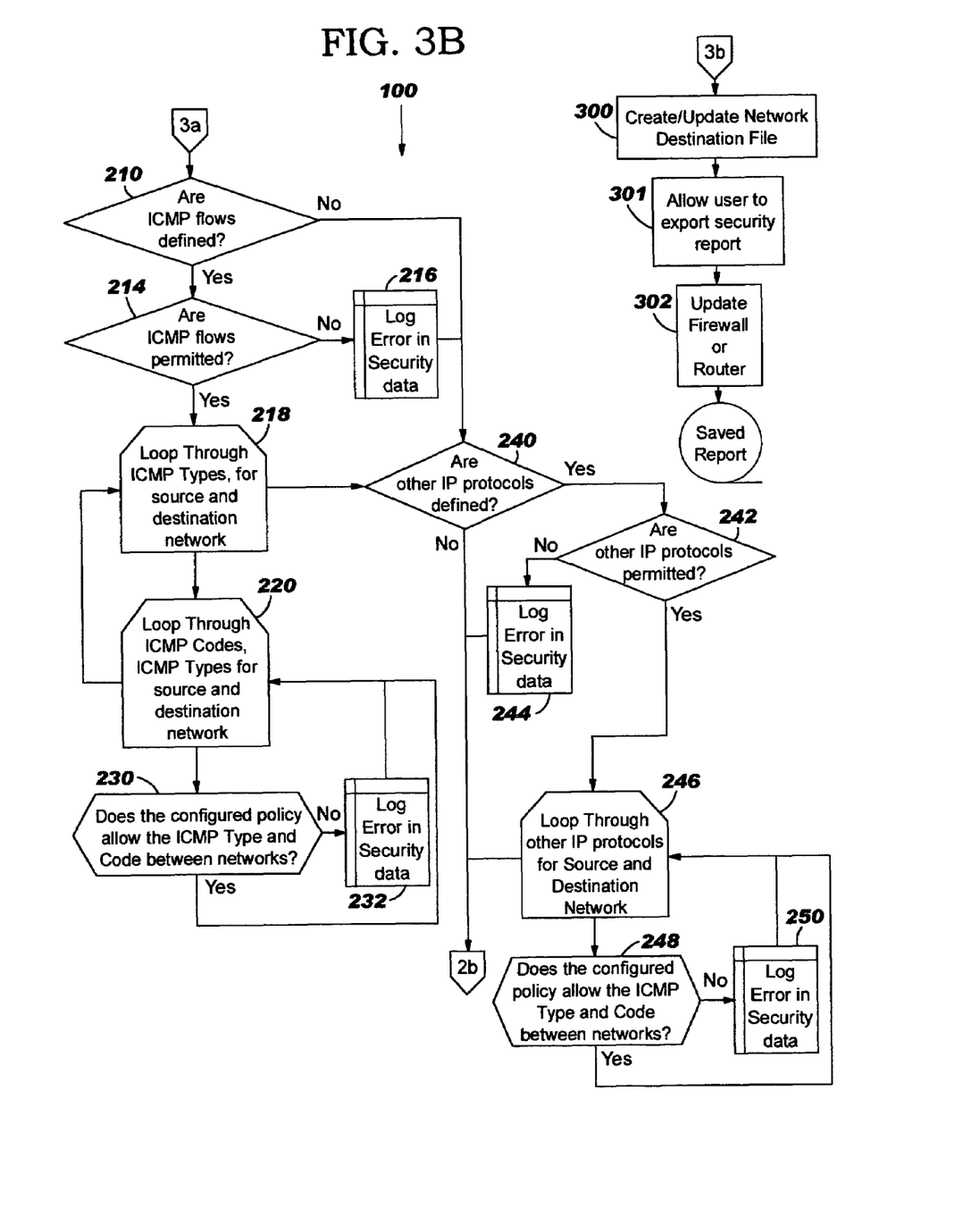

FIGS. 3(*a*) and (*b*) form a flow chart illustrating a security checking function 100 within the security checking program 70 according to the present invention. Security checking function 100 is also run by the systems administrator on network manager workstation 34. Security checking function 100 is run after the initialization function 68 is run. The purpose of the security checking function 100 is to compare the definition of each network object to the definitions of each other network object for every other possible communication partner to determine if communication is authorized and if so, what protocols are authorized. The authorizations are recorded in authorization table 71.

Security checking function 100 begins by identifying each possible "source" network object (i.e. each possible source of a communication that is sent to a "destination" network) (step 102). Then, security checking function 100 determines if this source network object has a defined network type as described above in FIG. 2 (decision 104). If not, this source network object is listed as "unknown" (step 106) within the network object datastructure. Referring again to decision 104, if the source network object has been defined, this definition is used by the security checking function 100 (step 108). Then, function 100 identifies each possible "destination" network object (i.e. each possible destination for a communication from a source network) (step 120). Then, security checking function 100 determines if this destination network object has a defined network type as described above in FIG. 2 (decision 124). If not, this destination network object is listed as "unknown" (step 126) within the network object datastructure. If so, this definition is used by the security checking function 100 (step 128).

For every possible combination of source network object and destination network object, security checking function 100 does the following based on the network definitions created by function 68. Security checking function 100 determines if the source network object type and destination network object type were defined as described above in FIG. 2 (decision 142). If either source or destination network do not have a valid defined type, this is recorded as an error in the table 71 (step 143). The table has a set of entries for each combination of source network and respective destination network. Referring again to decision 142, if both networks in the definition have been defined, security checking function 100 determines if each network of the combination is permitted any communication with the other network of the combination, i.e. are the two types of networks compatible (step 144). If not, an error is recorded in the table (step 145) and the security checking function loops back to step 120. If so, security checking function 100 checks whether TCP is defined as a supported IP protocol for each of the source network and respective destination network in each combination (decision 147). If the firewall does not have any TCP flows defined for this source/destination network combination, function 100 moves to decision 180. If TCP flows are defined, function 100 determines if both the source network and respective destination network types permit usage of TCP (decision 148). If not, an error is recorded in the table for this combination of source network and destination network (step 150). If so, then function 100 checks the security policies of both the source network and the destination network for the permitted TCP ports (step 152) to determine if the TCP source ports are consistent with both policies (decision 154). If not, function 100 records an error in the table (step 160). If so, then function 100 loops back to step 152 to analyze the next TCP port in the current source and destination network flow.

After all the TCP combinations have been analyzed as to the compliance of the TCP source ports, function 100 performs an analogous check for the TCP destination ports. Thus, function 100 checks the security policies of both the source network object and the respective destination network object of each combination for TCP destination ports (step 170) to determine if the TCP destination ports are consistent with the policy (decision 172). If not, function 100 records an error in the table (step 176). If so, then function 100 loops back to step 170 to analyze the next TCP destination port in the current combination of source network and destination network.

After the TCP ports of the current combination of source network and destination network have been analyzed in this manner, function 100 checks whether UDP flows have been configured in the firewall or router configuration for the current source network object and destination network object (step 180). If the firewall does not have any UDP flows defined for this source and destination network combination function 100 moves to decision 210. If UDP flows are configured, then function 100 determines if the UDP flows are permitted by each of the source network and destination network of each combination (decision 184). If not, function 100 records an error in the table (step 186) and continues on to decision 210. If UDP flows are permitted, then function 100 checks the security policy for both the source network and the destination network for each UDP source port (step 188) to determine if the UDP source port is consistent with the policy (decision 190). If not, function 100 records an error in the table (step 192) and then loops back to step 188 to analyze the next UDP source port of the current source and destination network combination. If so, then function 100 loops back to step 188 to analyze the next UDP source port in the current combination of source networks and destination networks.

After all the combinations have been analyzed as to the compliance of the UDP source ports, function 100 performs an analogous check for the UDP destination ports. Function 100 checks the security policy of both the source network object and the destination network object for each UDP destination port (step 202) to determine if the UDP destination port for the current source network and destination network are consistent with the policy (decision 204). If not, function 100 records an error in the table (step 206) and then loops back to step 202 to analyze the next UDP destination port for the current source network and destination network combination. If so, then function 100 loops back to step 202 to analyze the next UDP destination port for the current source network and destination network combination.

After the UDP destination ports of all the current source network/destination network combination have been analyzed as to the compliance with the security policy of both networks in the respective combination, function 100 checks whether the router or firewall has ICMP flows defined for the current source network object and destination network object combination (decision 210). If the router or firewall does not have any ICMP flows configured then function 100 moves to decision 240. If ICMP flows are defined, then function 100 determines if the ICMP flows are permitted with the source network object and destination network object of the current combination (decision 214). If not, then function 100 records an error in the table for that respective combination (step 216). If ICMP flows are defined, then function 100 checks the ICMP type for the source network and destination network of the current combination (step 218) and then the ICMP codes for the source network and destination network of the current combination (step 220) to determine if they are consistent with the security policy of the source node and destination node of the current combination (decision 230). If not, function 100 records an error in the table (step 232) and loops back to step 220 to analyze the next code. When all the codes are checked for each type it loops back to analyze the next code (step 218).

Next, function 100 checks the current source network object and respective destination network object to determine if any other IP protocols are defined (decision 240). If no other IP protocols are defined then function 100 loops back to analyze the next destination network (step 120). If other IP protocols are configured, function 100 determines if the policy permits another such defined IP protocol for the current source network and destination network (decision 242). If not, then function 100 records an error in the table (step 244) and loops back to analyze the next destination network (step 120). If the security policy permits other IP protocols, for the current combination of source network and destination network (step 246), function 100 determines if one of the other defined IP protocols is permitted by the security policy of the current source network and the destination network combination (step 248). If the other IP protocol is not permitted, function 100 records an error in the table (step 250) and then loops back to step 246.

Next, function 100 loops back to step 120 repeating all subsequent steps for the next destination network. When all destination networks have been analyzed function 100 loops back to step 102 to analyze the next source network, repeating all subsequent steps in the function.

After all the foregoing steps illustrated in FIGS. 3(a) and (b) are performed, an absence of an error in the table for each combination of source network object and destination network object and IP protocol (including additional criteria) indicates authorization for such a communication. Then the network object data structure is stored in the network definition file (step 300). Then, the table 71 can be sent to the systems administrator at each network (step 301) to update the firewall or router at his or her network accordingly (step 302). The errors in the table can be displayed at each network so the central systems administrator at the network can correct or change the security policy, IP configuration or network type of the network if desired. If any such changes are made, they are communicated to the systems administrator of network 11 to rerun security checking program 70.

Based on the foregoing, systems and methods for automatically checking compliance with security policies of networks have been disclosed. However, numerous modifications and substitutions can be made without deviating from the scope of the present invention. For example, rather than looping through all defined networks for both source and destination network analysis, it may be acceptable in some scenarios to only analyze the defined source networks and then only the configured destination networks for each configured data flow. Therefore, the present invention has been disclosed by way of illustration and not limitation, and reference should be made to the following claims to determine the scope of the present invention.

The invention claimed is:

1. A system for managing a security policy for a multiplicity of networks, said system comprising:
   means for recording, for each of said multiplicity of networks, (a) a type of said each network, (b) whether said each network is a source and/or a destination network, and (c) a list of IP protocol(s) supported by said each network, said multiplicity of networks comprising a trusted type, a DMZ type, and an untrusted type, said DMZ type of network being managed by a same enterprise that manages said trusted type of network to provide security for said DMZ type of network;
   means for recording, for said each network, a multiplicity of permitted message flows for which a firewall for said each network is configured, each of said permitted message flows comprising a combination of IP protocol, destination network and source network;
   means for automatically identifying a multiplicity of possible combinations of said multiplicity of networks, wherein each of said possible combinations comprises a source network and a destination network;

means for automatically determining, based on a type of said each network, a subset of said possible combinations, each of said possible combinations in said subset comprising two networks which are permitted to communicate with each other based on the respective types of said two networks, a trusted network being permitted to communicate with said DMZ network but not with said untrusted network, said DMZ network being permitted to communicate with both said trusted network and said untrusted network;

means for automatically determining, for each of said possible combinations in said subset, (a) what IP protocol(s) are supported by said networks in said each possible combination in said subset, and (b) whether respective firewalls for said networks in said each possible combination in said subset permit message flows having IP protocols supported by said networks in said each possible combination of said subset; and means, based on determinations by both automatic determining means, for automatically determining which combinations of said multiplicity of networks comprise networks which are both (a) entitled to communicate with each other based on types of networks within each combination of said multiplicity of networks and (b) able to communicate with each other based on IP protocols supported by networks in each combination of said multiplicity of networks and IP protocols of permitted message flows through a firewall(s) for networks in each combination of said multiplicity of networks.

2. A system as set forth in claim 1 wherein said IP protocol(s) supported by said multiplicity of networks comprise TCP and UDP.

3. A system as set forth in claim 2 wherein:

said IP protocol(s) supported by said multiplicity of networks also comprise ICMP; and the means for automatically determining, for each of said possible combinations in said subset, (a) what IP protocol(s) are supported by said networks in said each possible combination in said subset, and (b) whether respective firewalls for said networks in said each possible combination in said subset permit message flows having IP protocols supported by said networks in said each possible combination of said subset, include means for comparing ICMP codes and types for said networks in said each possible combination in said subset.

4. A system as set forth in claim 3 wherein all of said means reside in a computer on said trusted network.

5. A system as set forth in claim 1 wherein said multiplicity of possible combinations of said multiplicity of networks comprises all possible combinations of said multiplicity of networks.

* * * * *